(12) United States Patent
Yan et al.

(10) Patent No.: US 8,502,431 B2
(45) Date of Patent: Aug. 6, 2013

(54) COIL STRUCTURE FOR A CORELESS MOTOR

(75) Inventors: Guo-Jhih Yan, Kaohsiung (TW); Guang-Miao Huang, Kaohsiung (TW); Jing-Hui Wang, New Taipei (TW); Cheng-Liang Yao, Kaohsiung (TW); Hsin-Te Wang, New Taipei (TW); Liang-Yi Hsu, Penghu County (TW)

(73) Assignee: Metal Industries Research and Development Centre, Kaohsiung (TW)

( * ) Notice: Subject to any disclaimer, the term of this patent is extended or adjusted under 35 U.S.C. 154(b) by 252 days.

(21) Appl. No.: 12/962,304

(22) Filed: Dec. 7, 2010

(65) Prior Publication Data
US 2011/0133591 A1 Jun. 9, 2011

(30) Foreign Application Priority Data
Dec. 9, 2009 (TW) ................................ 98142082 A (51) Int. Cl.
*H02K 3/04* (2006.01)
*H02K 3/26* (2006.01)

(52) U.S. Cl.
USPC .......................................... 310/177; 310/198

(58) Field of Classification Search
USPC ................ 310/198, 177, 215, 256.1, 40 MM, 310/DIG. 6; 336/200
See application file for complete search history.

(56) References Cited

U.S. PATENT DOCUMENTS

| | | | | |
|---|---|---|---|---|
| 4,340,833 A | * | 7/1982 | Sudo et al. | 310/268 |
| 6,005,324 A | * | 12/1999 | Kim | 310/268 |
| 7,999,650 B2 | * | 8/2011 | Mori | 336/200 |
| 2005/0285470 A1 | * | 12/2005 | Itoh et al. | 310/208 |

FOREIGN PATENT DOCUMENTS
WO WO 2008/066141 * 6/2008

* cited by examiner

*Primary Examiner* — Tran Nguyen
*Assistant Examiner* — Leda Pham
(74) *Attorney, Agent, or Firm* — Christie, Parker & Hale, LLP (57) ABSTRACT

A coil structure for a coreless motor includes a plurality of first conductive traces and a plurality of second conductive traces. The first conductive traces are disposed in succession relative to one another, and are each arranged into a planar spiral configuration having a substantially polygonal shape. At least one adjacent pair of the first conductive traces cooperate to define a space therebetween. Each of the second conductive traces is disposed in the space defined by a corresponding adjacent pair of the first conductive traces, and is arranged into a planar spiral configuration that has one of a substantially triangular shape and a substantially rhombic shape so as to substantially fill the space.

8 Claims, 6 Drawing Sheets

COIL STRUCTURE FOR A CORELESS MOTOR

CROSS-REFERENCE TO RELATED APPLICATION

This application claims priority of Taiwanese Application No. 098142082, filed on Dec. 9, 2009.

BACKGROUND OF THE INVENTION

1. Field of the Invention

The invention relates to a coil structure, more particularly to a coil structure for a coreless motor.

2. Description of the Related Art

One type of electric motor is called "coreless motor", the armature of which is constructed without an iron core, and is referred hereinafter as the "coreless armature". Without the iron core, issues related to ferromagnetic saturation and iron loss are reduced in the coreless motor. In addition, the coreless motor has the advantages of being lightweight and compact in size, such that fast acceleration and low cogging torque can be achieved, making the coreless armature applicable in small and micro motor applications. The techniques for manufacturing flexible printed circuit boards can be utilized for the production of the coreless armature.

Figure 1A:
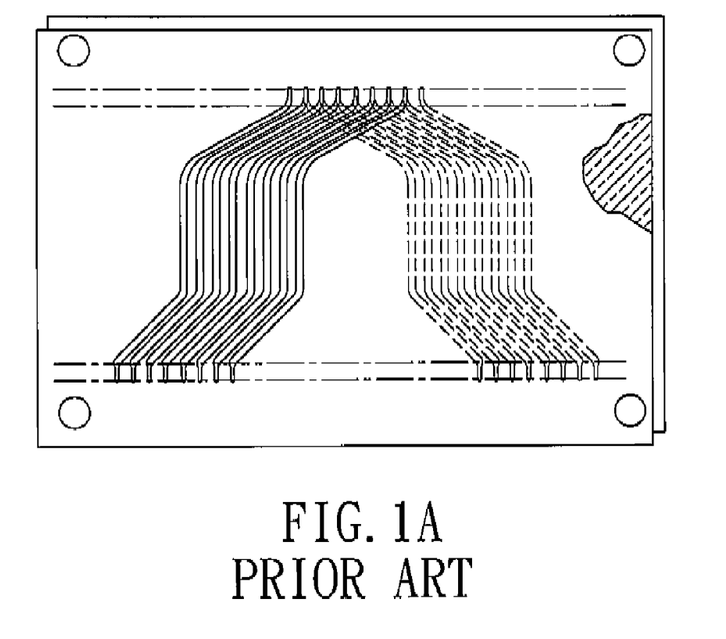
FIG. 1A is a schematic diagram, illustrating a conventional coil structure having an undulated series winding arrangement.
Figure 1B:
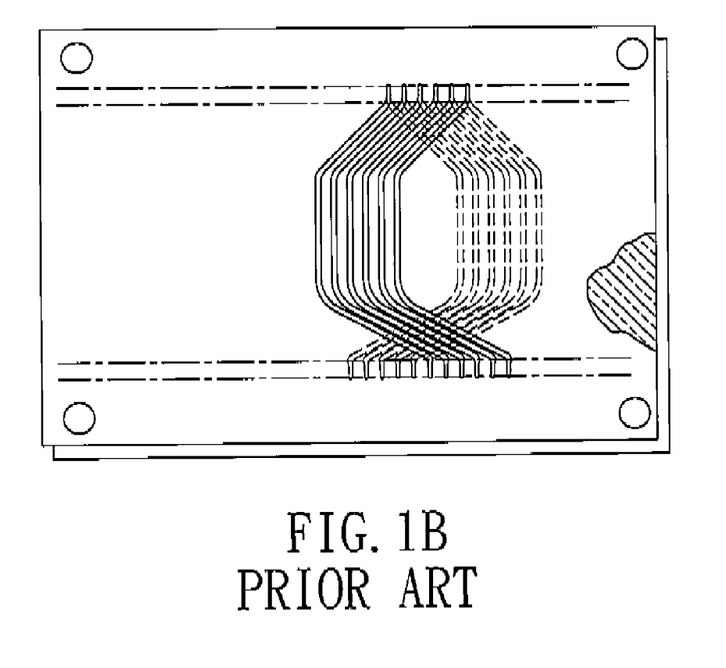
FIG. 1B is a schematic diagram, illustrating a conventional coil structure having a lap coil winding arrangement.
Figure 2:
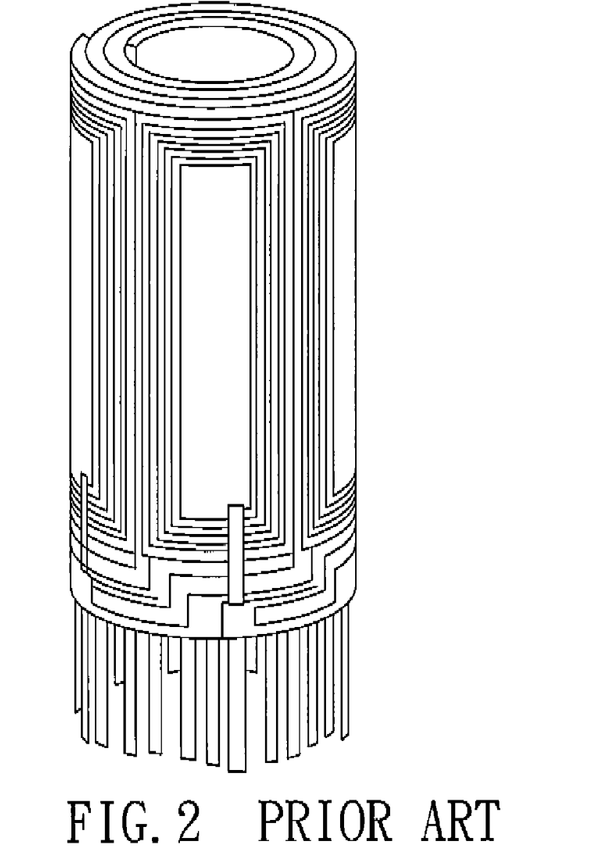
FIG. 2 is a schematic perspective diagram, illustrating another type of winding arrangement for a conventional coil structure.
Figure 3:
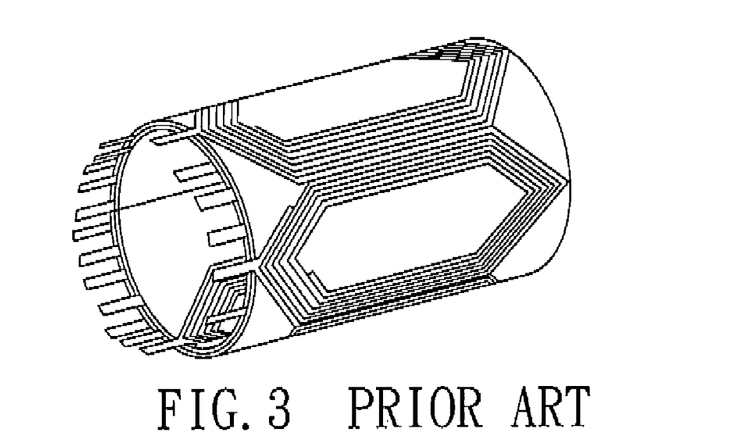
FIG. 3 is a schematic perspective diagram, illustrating yet another type of winding arrangement for a conventional coil structure.

FIG. 1A and FIG. 1B respectively illustrate two types of winding arrangement for conventional coil structures, where shown in FIG. 1A is the "undulated series winding" or "spiral winding" arrangement, and shown in FIG. 1B is the "lap coil winding" arrangement. A disadvantage common to these two types of winding arrangement is that the turning points of the windings are non-effective areas (i.e., do not contribute to the operation of the coreless armature) since the electric current flowing therethrough are in opposite directions. Shown in FIG. 2 is another type of winding arrangement for the conventional coil structure, where a plurality of windings are disposed on a substrate in succession relative to one another, and are each arranged in a rectangular spiral configuration. However, this arrangement has the disadvantage that, such rectangular-shape coils have more extraneous end-windings and may result in lower contribution to the operation of the coreless armature for the same copper loss. Shown in FIG. 3 is a type of winding arrangement for the conventional coil structure similar to that shown in FIG. 2. In FIG. 3, the windings are disposed on a substrate in succession relative to one another, and are each arranged in a hexagonal spiral configuration. As compared to the rectangular spiral configuration, the end portions of the hexagonal spiral configuration are reduced in length, but non-effective areas (or blank area) are still created between the end portions of two adjacent windings since no windings are present thereat. Moreover, both the rectangular and hexagonal spiral configurations shown in FIGS. 2 and 3 are elongated configurations, an adverse consequence of which is that when both sides of the substrate is provided with the windings, large areas need to be spared in the middle of the elongated configurations in order to accommodate the provision of conductive vias that interconnect corresponding windings on both sides of the substrate, again creating wasted, i.e., non-effective, areas.

In other words, there is the need for reducing the non-effective areas in coil structures so as to enhance the electromagnetic effect thereof, to thereby enhance the overall performance of the coreless motors incorporating the coil structures.

SUMMARY OF THE INVENTION

Therefore, the object of the present invention is to provide a coil structure for a coreless motor that increases space utilization, and that reduces non-effective areas of windings thereof, to thereby increase the electromagnetic effect of the coil structure and in turn enhance the overall performance of the cureless motor.

According to the present invention, there is provided a coil structure for a coreless motor that includes a plurality of first conductive traces and a plurality of second conductive traces. The first conductive traces are disposed in succession relative to one another, and are each arranged into a planar spiral configuration having a substantially polygonal shape. At least one adjacent pair of the first conductive traces cooperate to define a space therebetween. Each of the second conductive traces is disposed in the space defined by a corresponding adjacent pair of the first conductive traces, and is arranged into a planar spiral configuration that has one of a substantially triangular shape and a substantially rhombic shape so as to substantially fill the space.

The advantages of the present invention lie in that space utilization of the coil structure is increased and non-effective areas are reduced with the provision of the second conductive traces in the spaces created by adjacent ones of the first conductive traces that are disposed in succession relative to one another, and with the shapes of the planar spiral configurations being polygon, triangle or rhombus. Consequently, given the same surface area of the substrate, the present invention can provide better electromagnetic effects.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 4:
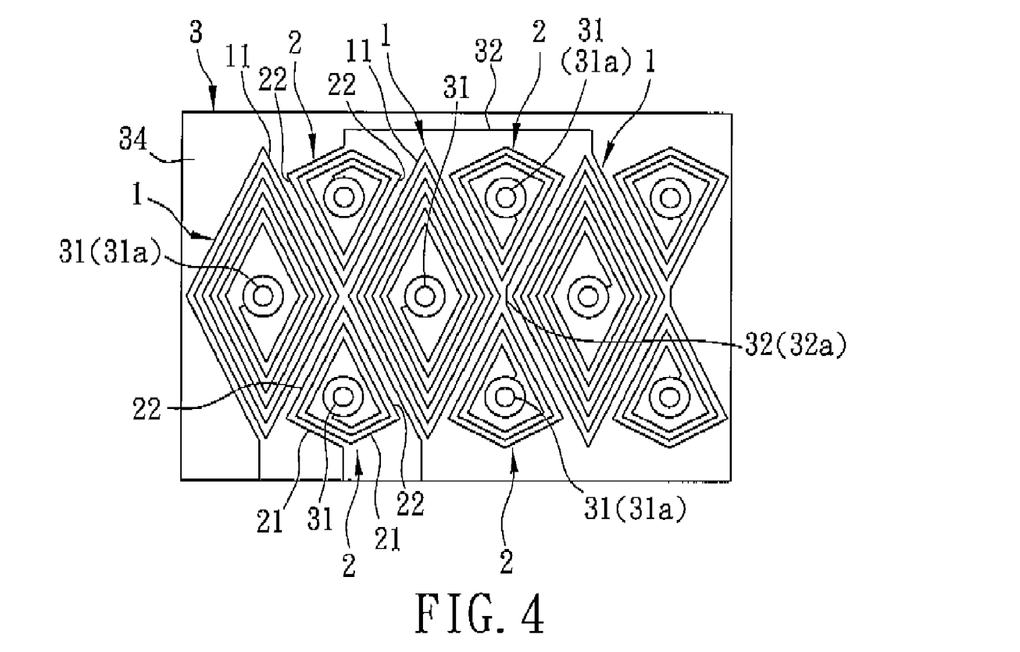
FIG. 4 is a schematic top view of the first preferred embodiment of a coil structure according to the present invention, illustrating a first group of first, second and interconnecting conductive traces disposed on a first surface of a substrate.
Figure 5:
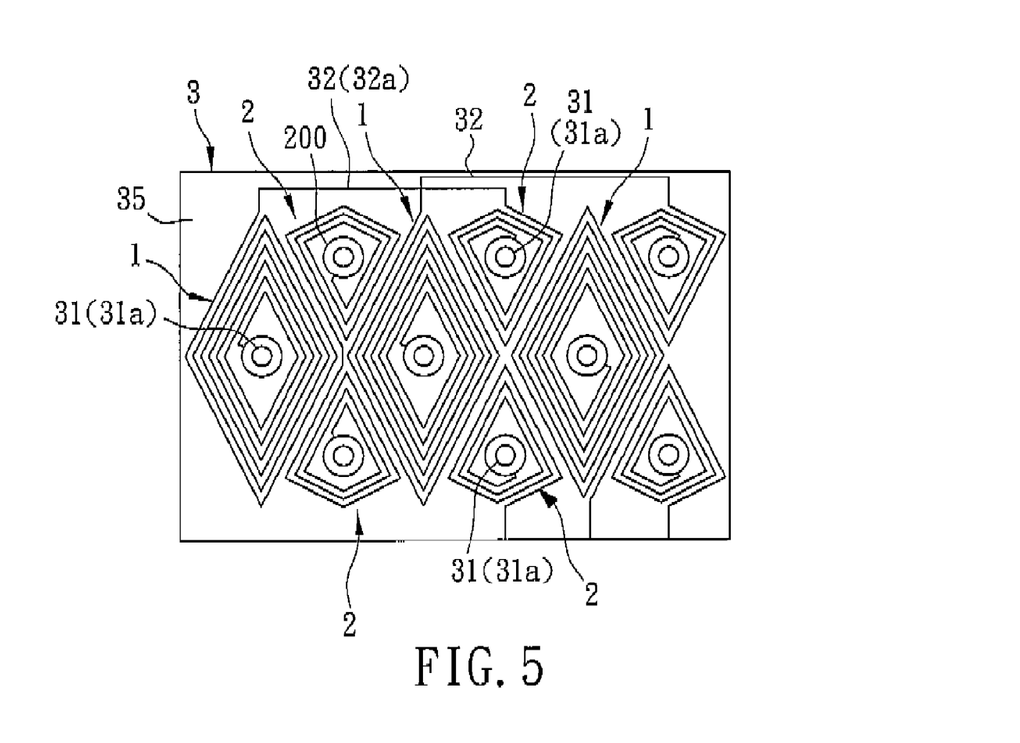
FIG. 5 is a schematic view similar to FIG. 4, illustrating a second group of the first, second and interconnecting conductive traces disposed on a second surface of the substrate.

With reference to FIG. 4 and FIG. 5, the first preferred embodiment of a coil structure according to the present invention is adapted for use in a coreless motor, specifically for a radial flux type coreless motor. The coil structure includes a plurality of first conductive traces 1, and a plurality of second conductive traces 2.

The first conductive traces 1 are disposed in succession relative to one another, and are each arranged into a planar spiral configuration having a substantially polygonal shape. At least one adjacent pair of the first conductive traces 1 cooperate to define a space therebetween. Preferably, the polygonal shape is one of a rhombus shape and a hexagonal shape, and the space is defined by two segments 11 of the corresponding adjacent pair of the first conductive traces 1 that face each other and that form an included angle therebetween.

Each of the second conductive traces 2 is disposed in the space defined by a corresponding adjacent pair of the first conductive traces 1, and is arranged into a planar spiral configuration that has one of a substantially triangular shape and a substantially rhombic shape so as to substantially fill the space.

In this embodiment, the coil structure further includes a non-conducting substrate 3 on which the first and second conductive traces 1, 2 are disposed. The space is defined by a corresponding edge of the non-conducting substrate 3 and the corresponding adjacent pair of the first conductive traces 1.

In this embodiment, each of the second conductive traces 2 is arranged into a substantially rhombic planar spiral configuration, which has two short sides 21 and two long sides 22. Preferably, each of the long sides 22 of the each of the second conductive traces 2 is parallel to the segment 11 of the corresponding one of the first conductive traces 1 adjacent to which it is disposed.

The non-conducting substrate 3 has opposite first and second surfaces 34, 35. The first and second conductive traces 1, 2 are formed on at least one of the first and second surfaces 34, 35. In this embodiment, the coil structure includes two groups of the first and second conductive traces 1, 2 respectively disposed on the first and second surfaces 34, 35 of the non-conducting substrate 3 in symmetrical relationship relative to each other. In addition, the non-conducting substrate 3 is formed with a plurality of conductive vias 31 that extend through the first and second surfaces 34, 35, and that interconnect corresponding ones of the first and second conductive traces 1, 2 of the two groups so as to form at least one independent conductive path.

The coil structure further includes a plurality of interconnecting conductive traces 32 that are each disposed on a corresponding one of the first and second surfaces 34, 35 of the substrate 3, and that are each connected to corresponding ones of the first/second conductive traces 1, 2. The interconnecting conductive traces 32 cooperate with the conductive vias 31 to connect corresponding ones of the first and second conductive traces 1, 2, such that the coil structure of the first preferred embodiment is formed with three independent conductive paths (i.e., three phase windings). In particular, through the conductive vias labeled "31a" and the interconnecting conductive traces labeled "32a", the leftmost one of the first conductive traces 1 on the first surface 34 as shown in FIG. 4 is connected in series to the leftmost one of the first conductive traces 1 on the second surface 35 as shown in FIG. 5, the top middle one of the second conductive traces 2 on the second surface 35 as shown in FIG. 5, the top middle one of the second conductive traces 2 on the first surface 34 as shown in FIG. 4, the bottom middle one of the second conductive traces 2 on the first surface 34 as shown in FIG. 4, and the bottom middle one of the second conductive traces 2 on the second surface 35 as shown in FIG. 5 so as to form a first independent conductive path referred to as the "phase winding (A)". In other words, the phase winding (A) is constituted by one pair of the first conductive traces 1 disposed respectively and symmetrically on the first and second surfaces 34, 35 of the substrate 3, and two pairs of the second conductive traces 2 disposed respectively and symmetrically on the first and second surfaces 34, 35. Two other independent conductive paths referred to as the "phase winding (B)" and the "phase winding (C)" are formed in a similar fashion. Therefore, further details of the same are omitted herein for the sake of brevity. It should be noted herein that the number of each of the first and second conductive traces 1, 2 in each independent conductive path is not limited to that disclosed hereinabove in other embodiments of the present invention. In addition, the present invention is also not limited in the manner in which the independent conductive paths are formed.

Furthermore, according to the present invention, the non-conducting substrate 3 may be a flexible substrate that can be rolled into a roll or a rigid substrate that is formed into a roll-shape. Each of the two segments 11 of the corresponding adjacent pair of the first conductive traces 1 extends spirally with reference to an axial direction of the coreless motor when the non-conducting substrate 3 is formed into a roll.

Under the implementation of the flexible substrate, the coil structure of the present invention may take the form of a flexible printed circuit board, where the first, second and interconnecting conductive traces 1, 2, 32 and the conductive vias 31 are formed on the flexible substrate using conventional printed circuit board manufacturing techniques, further details of which are known in the art and are therefore omitted herein for the sake of brevity.

Under the implementation of the rigid substrate that is formed into a roll-shape, the coil structure of the present invention may be manufactured by arranging enameled wires in the planar spiral configurations so as to serve as the first and second conductive traces 1, 2, and adhering the same to the rigid substrate. In addition, when both the first and second sides 34, 35 of the non-conducting substrate 3 are to be provided with the first and second conductive traces 1, 2, the rigid substrate is formed with through holes, instead of conductive vias 31, for extension of the corresponding enameled wires therethrough for interconnecting corresponding first and second traces 1, 2 on the first and second surfaces 34, 35.

It should be noted herein that, depending on practical needs, the first and second conductive traces 1, 2 may also be formed on a surface of a target object in other embodiments of the present invention.

Figure 6:
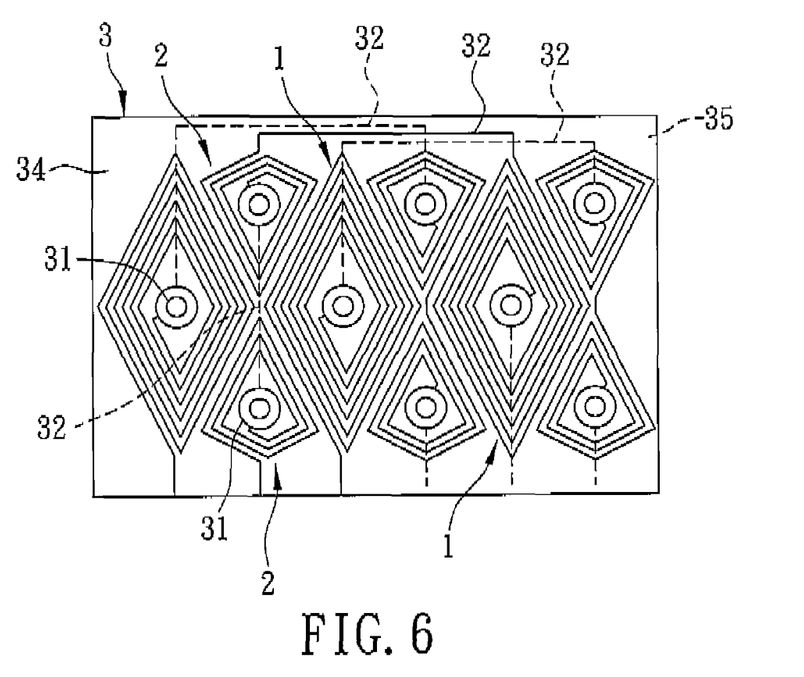
FIG. 6 is a schematic view of the second preferred embodiment of a coil structure according to the present invention.

With reference to FIG. 6, the second preferred embodiment of the coil structure according to the present invention differs from the first preferred embodiment in that the first and second conductive traces 1, 2 of the second preferred embodiment are all disposed on the first surface 34 of the substrate 3, and only some of the interconnecting conductive traces 32 are disposed on the second surface 35 of the non-conducting substrate 3 (shown using dashed lines). As with the first preferred embodiment, three independent conductive paths are formed in the second preferred embodiment.

Figure 7:
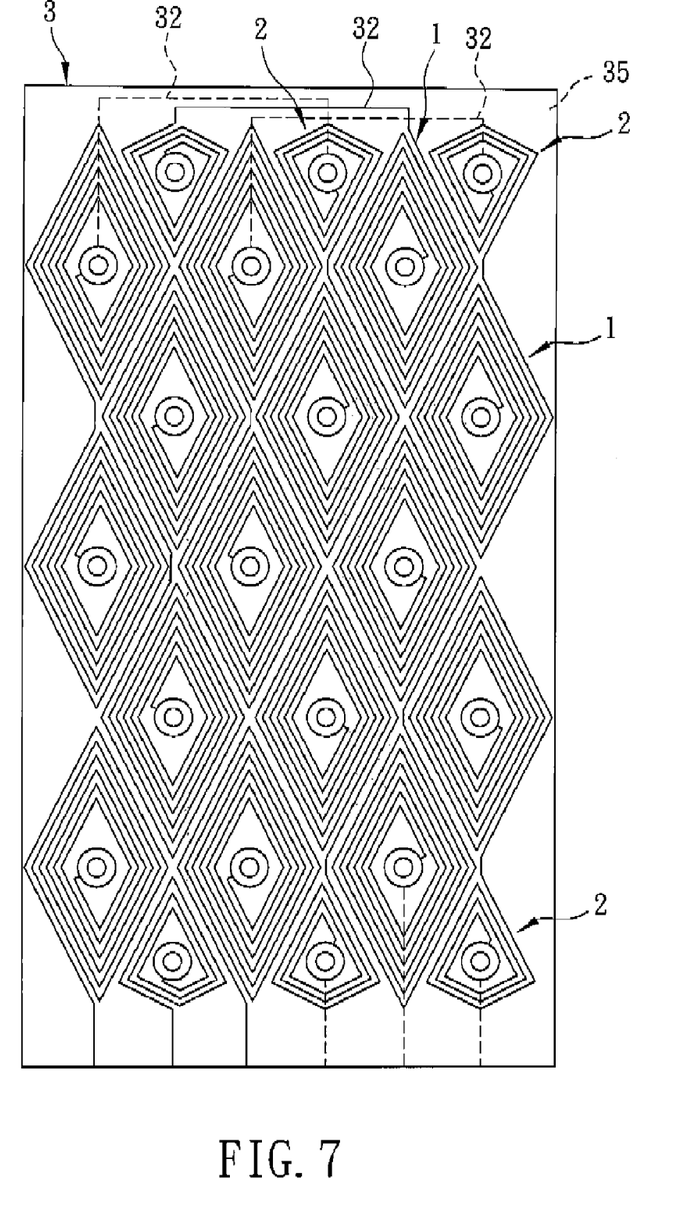
FIG. 7 is a schematic view of the third preferred embodiment of a coil structure according to the present invention.

With reference to FIG. 7, the third preferred embodiment of the coil structure according to the present invention differs from the second preferred embodiment in that the coil structure of the third preferred embodiment is for use in an elongated DC motor. Accordingly, there are five rows of the first conductive traces 1 disposed in succession relative to one another, and only the top and bottom rows of the first conductive traces 1 form spaces with the top and bottom edges of the non-conducting substrate 3 to be filled by the second conductive traces 2.

Figure 8:
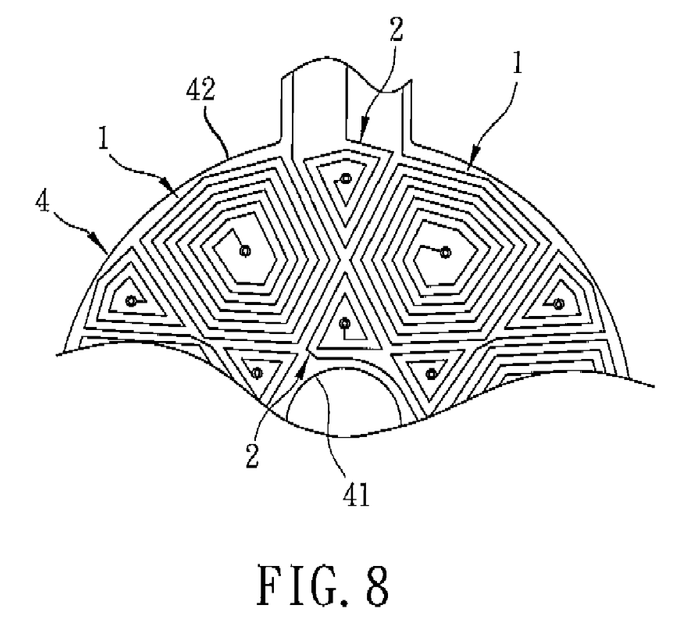
FIG. 8 is a fragmentary schematic view of the fourth preferred embodiment of a coil structure according to the present invention.

With reference to FIG. 8, the fourth preferred embodiment of the present invention differs from the previous embodiments in that the coil structure is for use in a pancake DC motor (i.e., axial flux type coreless motor), instead of a radial flux type coreless motor as with the previous embodiments. The coil structure of the fourth preferred embodiment includes a non-conducting annular substrate 4 having opposite inner and outer annular edges 41, 42. One of the inner and outer annular edges 41, 42 of the non-conducting annular substrate 4 cooperates with at least one adjacent pair of the first conductive traces 1 to define the space thereamong. In this embodiment, each of the inner and outer annular edges 41, 42 of the non-conducting annular substrate 4 cooperates with adjacent pairs of the first conductive traces 1 to define spaces thereamong.

Each of the second conductive traces 2 is disposed in the space cooperatively defined by a corresponding one of the inner and outer annular edges 41, 42 and a corresponding adjacent pair of the first conductive traces 1.

In this embodiment, each of the first conductive traces 1 is formed into a substantially hexagonal planar spiral configuration, and each of the second conductive traces 2 is formed into one of a substantially triangular planar spiral configuration and a substantially rhombic planar spiral configuration.

In view of the above, the coil structure of the present invention achieves the following advantages and effects:

1. Better Space Utilization

Through the provision of the second conductive traces 2 in the spaces created by the segments 11 of adjacent pairs of the first conductive traces 1 that are disposed in succession relative to one another, and with the first and second conductive traces 1, 2 arranged in planar spiral configurations of their respective geometric shapes, the coil structure of the present invention utilizes space more effectively as compared to the prior art. In other words, for the same surface area, better electromagnetic performance can be provided by the present invention as compared to the prior art.

2. Less Non-Effective Areas

Through arranging the first and second conductive traces 1, 2 in planar spiral configurations on corresponding surfaces 34, 35 of the non-conducting substrate 3, the first and second conductive traces 1, 2 do not have turning points at junctions between the two surfaces 34, 35 of the non-conducting substrate 3, and thus do not create non-effective areas thereat. In addition, the complementing shapes of the planar spiral configurations for the first and second conductive traces 1, 2 create less wasted space as compared to the prior art, both at the end portions of the first conductive traces 1 adjacent to the edges of the non-conducting substrate 3 (since the second conductive traces 2 substantially fill the spaces) and in the middle of the planar spiral configurations for the provision of the conductive vias 31 (since the shapes of the planar spiral configurations are not elongated).

3. Enhanced Electromagnetic Performance

Overall speaking, since the coil structure of the present invention has better space utilization and less non-effective areas, the coil structure of the present invention produces enhanced electromagnetic performance as compared to the prior art, thereby enhancing the performance (e.g., output power, etc.) of the coreless motor that incorporates the same.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A coil structure for a coreless motor, comprising:
   a plurality of first conductive traces that are disposed in succession relative to one another, and that are each arranged into a planar spiral configuration having a substantially polygonal shape, at least one adjacent pair of said first conductive traces cooperating to define a space therebetween; and
   a plurality of second conductive traces, each of which is disposed in said space defined by a corresponding adjacent pair of said first conductive traces, and is arranged into a planar spiral configuration that has one of a substantially triangular shape and a substantially rhombic shape so as to substantially fill said space;
   wherein said first conductive traces differ from said second conductive traces in at least one of shape and size.

2. The coil structure as claimed in claim 1, wherein said polygonal shape is one of a rhombus shape and a hexagonal shape, said space being defined by two segments of the corresponding adjacent pair of said first conductive traces that face each other and that form an included angle therebetween.

3. The coil structure as claimed in claim 1, further comprising a non-conducting substrate on which said first and second conductive traces are disposed, said space being defined by a corresponding edge of said non-conducting substrate and the corresponding adjacent pair of said first conductive traces.

4. The coil structure as claimed in claim 3, wherein said non-conducting substrate has opposite first and second surfaces, said first and second conductive traces being formed on at least one of said first and second surfaces.

5. The coil structure as claimed in claim 4, comprising two groups of said first and second conductive traces respectively disposed on said first and second surfaces of said non-conducting substrate in symmetrical relationship relative to each other, wherein said non-conducting substrate is formed with a plurality of conductive vias that extend through said first and second surfaces, and that interconnect corresponding ones of said first and second conductive traces of said two groups so as to form at least one independent conductive path.

6. The coil structure as claimed in claim 3, wherein said non-conducting substrate is one of a flexible substrate that can be rolled into a roll and a rigid substrate that is formed into a roll-shape.

7. The coil structure as claimed in claim 6, wherein said polygonal shape is one of a rhombus shape and a hexagonal shape, said space being defined by the corresponding edge of said non-conducting substrate and two segments of the corresponding adjacent pair of said first conductive traces that face each other and that form an included angle therebetween, each of said two segments of said corresponding adjacent pair of said first conductive traces extending spirally with reference to an axial direction of the coreless motor when said non-conducting substrate is formed into a roll.

8. A coil structure for a pancake DC motor, comprising:
   a non-conducting annular substrate having opposite inner and outer annular edges;
   a plurality of first conductive traces that are disposed on said non-conducting annular substrate in succession relative to one another, and that are each arranged into a planar spiral configuration having a substantially polygonal shape, one of said inner and outer annular edges of said non-conducting annular substrate cooperating with at least one adjacent pair of said first conductive traces to define a space thereamong; and a plurality of second conductive traces that are disposed on said non-conducting annular substrate, each of said second conductive traces being disposed in said space cooperatively defined by a corresponding one of said inner and outer annular edges and a corresponding adjacent pair of said first conductive traces, and being arranged into a planar spiral configuration that has one of a substantially triangular shape and a substantially rhombic shape so as to substantially fill said space;

wherein said first conductive traces differ from said second conductive traces in at least one of shape and size.

* * * * *